Figure 1:
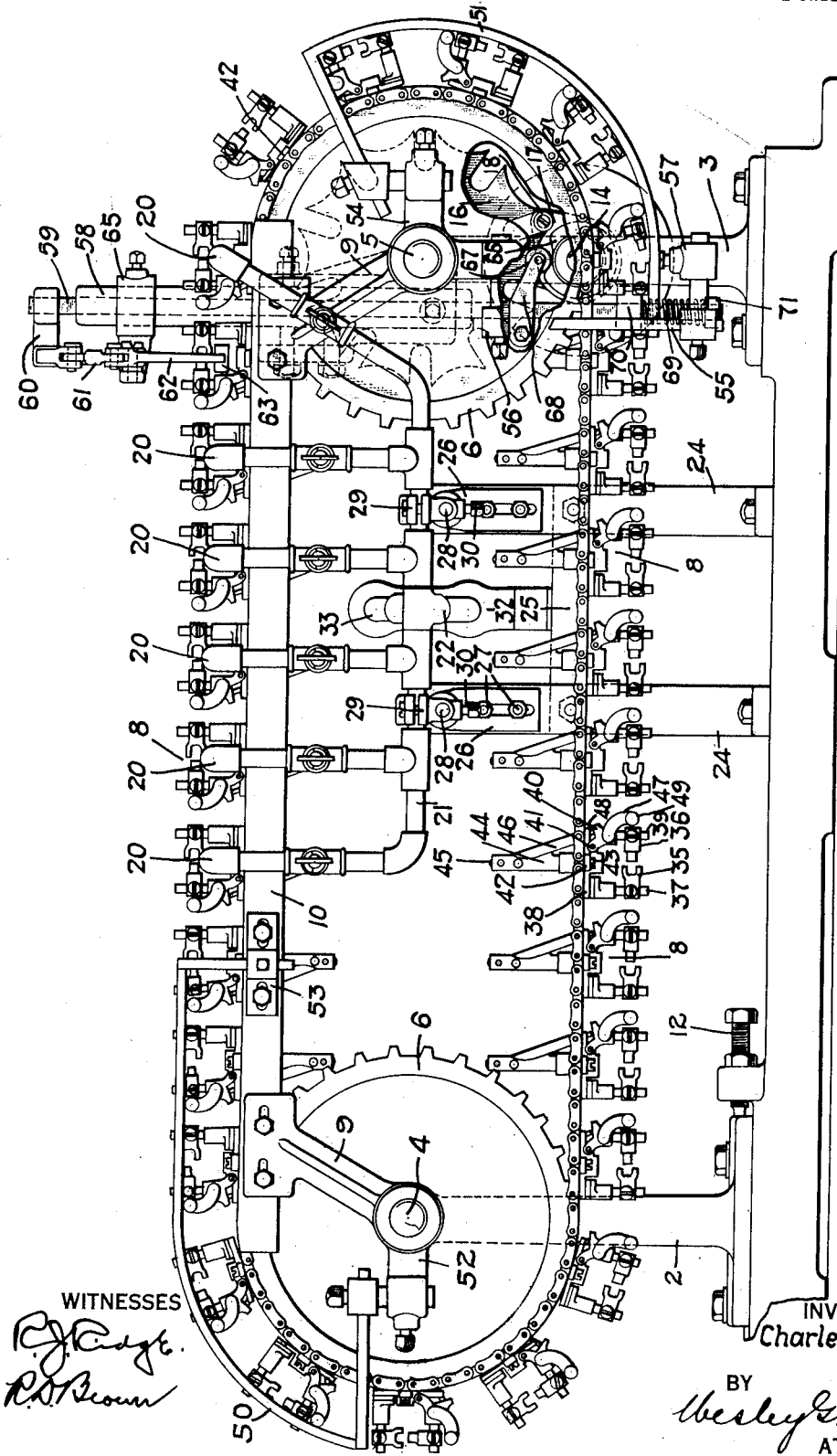

C. EISLER.
MACHINE FOR MAKING INCANDESCENT LAMP STEMS.
APPLICATION FILED JUNE 6, 1916.

1,338,500.

Patented Apr. 27, 1920.
2 SHEETS—SHEET 1.

WITNESSES

INVENTOR
Charles Eisler.
BY
ATTORNEY

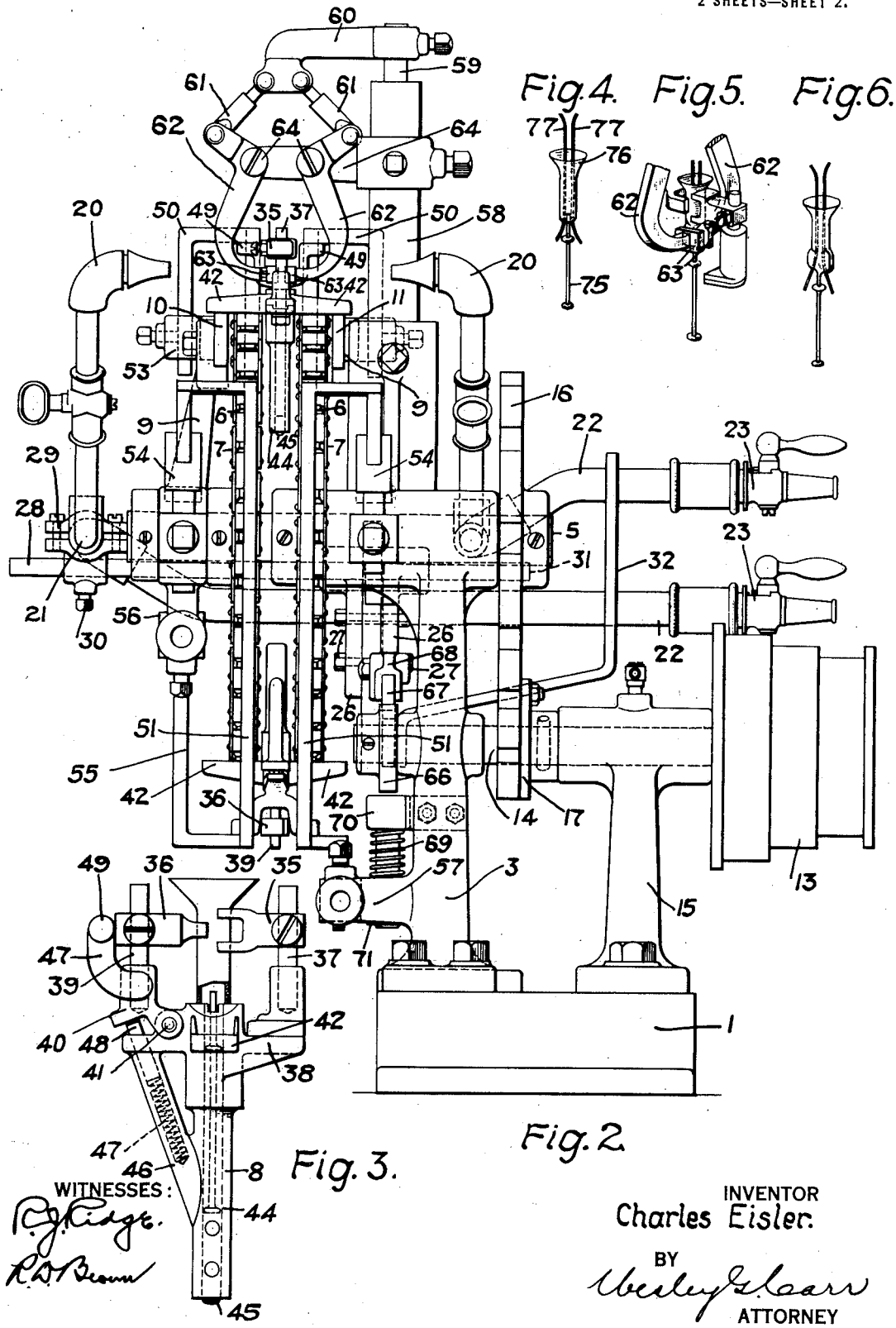

UNITED STATES PATENT OFFICE.

CHARLES EISLER, OF BLOOMFIELD, NEW JERSEY, ASSIGNOR TO WESTINGHOUSE LAMP COMPANY, A CORPORATION OF PENNSYLVANIA.

MACHINE FOR MAKING INCANDESCENT-LAMP STEMS.

1,338,500.     Specification of Letters Patent.     Patented Apr. 27, 1920.

Application filed June 6, 1916. Serial No. 101,926.

*To all whom it may concern:*

Be it known that I, CHARLES EISLER, a citizen of the United States, and a resident of Bloomfield, in the county of Essex and State of New Jersey, have invented a new and useful Improvement in Machines for Making Incandescent-Lamp Stems, of which the following is a specification.

My invention relates to the manufacture of incendescent electric lamps and it has special relation to apparatus for making lamp stems consisting of short glass tubes through which the leading-in wires extend, each stem having one flaring end and the opposite end flattened and, in some types of lamps, attached to the filament-supporting arbor.

The object of my invention is to provide a machine for manufacturing lamp stems of the above-indicated character, and other analogous articles of glass, in a continuous and automatic manner and in large numbers.

In the accompanying drawing, Figure 1 is a side elevational view, with parts broken away for the sake of clearness, illustrating a machine constructed in accordance with my invention. Fig. 2 is an end elevational view of the same machine as seen from the right of Fig. 1. Fig. 3 is a side elevational view of one of the work-holding jaws of the machine, and Figs. 4, 5 and 6 are fragmentary perspective views illustrating the progress of a stem through the machine.

Lamp stems of the kind to which my present invention relates have heretofore been made by assembling the flaring tube and the arbor upon suitable rotary holders and rotating these parts in contact with flames which evenly fuse the adjacent parts of the stem and the arbor. The rotation of the stem is then interrupted and the fused parts are pressed together by means of suitable pressure jaws. The rotation of the stem in the fusing flames has heretofore been thought to be necessary in order that the parts may be evenly heated, and the necessity for rotating the stems has greatly limited the possible output of the machines which have been used for this purpose. I have discovered that, if the stems are subjected to flames directed upon them from opposite sides for a sufficient length of time, the heating is substantially uniform, even though the stems are not rotated during the heating operation. I have taken advantage of this fact in designing the machine shown in the accompanying drawings and have provided for the necessary duration of the heating process by means of a considerable number of heating flames through which the stems successively pass.

The machine which I have shown herein consists essentially of a pair of parallel endless belts or chains carrying a considerable number of work-holding jaws which are caused to advance by successive short steps past a series of stationary burners and thence to a pressure device which compresses the fused ends of the stems. Suitable means are provided for opening the work-holding jaws at the feeding end of the machine and again at the discharge end of the machine.

For a more detailed description of my invention, reference may now be had to Figs. 1 and 2 of the accompanying drawings. From a base 1 rise standards 2 and 3 which respectively support shafts 4 and 5. Each of the shafts 4 and 5 carries a pair of spaced sprocket wheels 6 which engage and drive a pair of corresponding chains 7 to which are attached, at short intervals, a number of work-holding devices designated generally as clamps 8. The standards 2 and 3 also carry brackets 9 which adjustably support two spaced and parallel horizontal bars 10 and 11. These horizontal bars support the work-holding jaws upon the upper run of the chains 7 and prevent the chains from sagging. In order to adjust the tension of the chains 7, the standard 2 is slidingly mounted in ways upon the base 1, and its position is fixed by means of an adjusting screw 12.

Power for imparting a step-by-step rotation to the shaft 5 is derived from a pulley 13 secured to a short horizontal shaft 14 which is mounted in bearings in the standard 3 and in an adjacent standard 15. For transmitting power from the shaft 14 to the shaft 5, a Geneva stop motion is provided consisting of a slotted plate 16 secured to the shaft 5 and a driving wheel 17 carrying a roller 18 which engages the slots in the plate 16 in the usual manner, thereby advancing the sprocket wheels 6 and the chains 7 one step at each complete rotation of the driving shaft 14.

Adjacent to the positions which the work-carrying jaws assume upon the upper run of the chains 7 is a series of pairs of oppositely-directed gas burners 20 which, as shown, are six in number, but which may be more or less numerous, as desired. The set of six burners on each side of the machine is supplied with gas through a horizontal pipe 21 which communicates with a flexible feed pipe 22 controlled by a stop cock 23. For supporting the two sets of gas burners and providing for their vertical and lateral adjustment, two standards 24 connected by a bar 25 are secured to the base 1 and these standards carry pairs of slotted plates 26 which are secured in positions of vertical adjustment by means of bolts 27. The plates 26 at the front of the standards 24, as seen in Fig. 1, carry outwardly extending rods 28 upon each of which is slidably mounted a pipe clamp 29 which engages the adjacent section of the gas pipe 21 and is fixed in its adjusted position on the rod 28 by means of a set screw 30. The slotted plates 26 at the back of the standards 24 carry outwardly extending rods 31 which are similar to the rods 28 and which support pipe clamps similar to those just described. The flexible gas pipes 22 are positioned by means of a bent plate 32 secured, at its lower end, to the cross bar 25 and provided with an opening 33 through which the pipes 22 extend.

Each of the work-holding jaws 8 consists of a pair of coöperating V-shaped members 35 and 36, the member 35 being adjustably secured to a pin 37 that is rigidly secured to one arm of a cruciform plate 38. The jaw 36 is similarly secured to a pin 39 attached to a member 40 which is pivotally attached at 41 to the arm of the plate 38 opposite to that which carries the pin 37. The two remaining arms 42 of the cruciform plate 38 are attached, by means of screws 43, to the chains 7.

Centrally carried by the cruciform plate 38 and directly opposite to the work-engaging portions of the jaws 35 and 36 is a sleeve 44 provided, at its free end, with an adjustable pin 45, and carrying, at one side, a second inclined sleeve 46 which incloses a compression spring 47 bearing against a pin 48 which bears against the adjacent portion of the pivoted member 40 and thereby presses the jaw 36 toward the jaw 35. The pivoted member 40 carries a U-shaped lever 47 having outwardly extending lugs 49 which coöperate with stationary cam tracks 50 at the left of the machine and with other stationary cam tracks 51 at the opposite end of the machine to open the jaws at these points.

Each of the cam tracks 50 is adjustably carried by a bracket 52 projecting from the standard 2 and by a bracket 53 secured to the side of the horizontal bar 10, as seen in Fig. 1. One end of each of the cam tracks 51 is similarly carried by a bracket 54 projecting from the standard 3. The other end of one of the tracks 51 is supported by a vertical rod 55 adjustably attached, at its upper end, to a bracket 56 secured to one of the bearings of the shaft 5, and the second track 51 is attached, at its lower end, to a short horizontal rod adjustably carried by a bracket 57 projecting from the standard 3. As shown in Fig. 2, the tracks 50 and 51 are arranged in parallel pairs spaced apart to permit the jaw-operating lugs 49 to come into sliding engagement with them.

The standard 3 carries a vertical sleeve 58 within which is slidably disposed a rod 59 carrying, at its upper end, an arm 60, to which is attached a toggle mechanism consisting of short levers 61 and bell-crank levers 62, the lower arms of the levers 62, being curved, as shown in Fig. 2, and terminating in flat pressure plates 63. The bell-crank levers are pivotally attached, at 64, to a stationary arm 65 carried by the sleeve 58. It will be observed that a downward movement of the rod 59 operates the toggle mechanism just described to bring the pressure plates 63 forcibly toward each other. This operation is intermittently effected for the purpose of compressing the heated stems by means of a cam 66 secured to the driving shaft 14 and coöperating with the roller 67 which is carried by a lever 68 that is clamped to an intermediate portion of the rod 59, as shown at the right of Fig. 1. The rod 59 is pressed downwardly by means of a helical spring 69 which is compressed between a lug 70 projecting from the standard 3 and a collar 71 secured to the lower end of the rod 59. The cam 66 is provided with a single depression, as shown in Fig. 1, and, when the cam is rotated to the position shown, in which the roller 67 enters this depression, the spring 69 forces the rod 59 downwardly and thereby actuates the toggle mechanism in the manner described above.

In the operation of the machine which I have described above, the driving shaft 14 is driven in a counter-clockwise direction, as seen in Fig. 1, and a step-by-step movement in a clockwise direction is thereby imparted to the chains 7 carrying the work-holding clamps 8. As each of the clamps passes beneath the cam tracks 50, the jaws 35 and 36 are separated and the operator inserts an arbor 75, a stem 76 and a pair of leading-in wires 77 in the clamp, as shown in Fig. 4. The stop 45 limits the downward movement of the arbor and is so adjusted that the end of the arbor is inclosed within the narrower end of the stem. As the clamp leaves the cam tracks 50, the jaws 35 and 36 close and hold the stem firmly while the clamps advance to bring the stem successively into the flames projected by the burners 20. The heated stem is then carried between the pressure members 63, which may be heated by additional flames, if desired, and which, by the downward movement of the rod 59 produced by the cam 66 and the spring 69, in the manner described above, are brought forcibly toward each other and press together the fused portions of the stem and the arbor, thus producing a firm joint through which the leading-in wires 77 are sealed. At the next step beyond the pressure members 63, the stem is subjected to a final or annealing flame and then, after pausing at an intermediate or cooling position, the clamp is brought into engagement with the cam tracks 51 which separate the jaws 35 and 36 and permit an operator to remove the finished stems.

It will be observed that this machine is entirely automatic in its operation, the services of an operator being required only for charging the machine and for removing the finished articles. The feeding operation also may be made automatic if desired, the necessary flares, arbors and leading-in wires being supplied to the work-holding jaws from suitable hoppers. The capacity of the machine may be varied by increasing or decreasing its length and correspondingly altering the number of the burners 20. Numerous other structural alterations may obviously be made without exceeding the limits of my invention, and it is therefore to be understood that my invention comprehends all such modifications as fall within the scope of the appended claims.

I claim as my invention:

1. A glass-working machine comprising means for laterally and non-rotatively advancing in a rectilinear path a cylindrical or tubular glass object, means for heating a section of the said object, said heating means being adapted to function so as not to require the rotation of the work, and means for compressing the said heated section.

2. A glass-working machine comprising means for intermittently, laterally, and non-rotatively advancing in a rectilinear path a cylindrical or tubular glass object, means for heating a section of the said object at a sufficient number of successive positions so as not to require the rotation thereof, and means for compressing the said heated section.

3. A glass-working machine comprising successive pairs of oppositely directed gas burners arranged in parallel relation and of sufficient number so as to make the rotation of the work passed therebetween unnecessary, a carrier adapted to pass between the said burners, and a compression device disposed adjacent to one pair of the said burners.

4. A glass-working machine comprising pairs of oppositely directed gas burners, of sufficient number so as to render a tubular glass object passed therebetween suitably plastic without the rotation thereof, a carrier adapted to pass between the said burners, a compression device disposed adjacent to the said burners, and other burners disposed beyond the said compression device and arranged in parallel relation with respect to the said first-named burners.

5. A glass-working machine comprising means for laterally and non-rotatively advancing in a rectilinear path a cylindrical or tubular glass object, a plurality of burners adapted to project flames upon the said object transversely to its path of advancement for heating a section of the said object, said burners being adapted to function in sequence and present in sufficient number so as to render the rotation of the work unnecessary, and means for compressing the said heated section.

6. A glass-working machine comprising means for intermittently, laterally, and non-rotatively advancing in a rectilinear path a cylindrical or tubular glass object, a plurality of pairs of oppositely-directed burners, each pair being adapted to project flames upon a section of the said object in one of its successive positions, the number and design of said burners being such that it is unnecessary to rotate the object, and means for compressing the said heated section.

7. A glass-working machine comprising an endless chain or belt, a plurality of non-rotative work-holding clamps carried thereby, means for intermittently imparting a step-by-step movement to the said chain or belt, a plurality of heating devices adapted to project flames locally upon the objects carried by the said clamps, said heating devices being adapted to function in sequence and present in sufficient number so as to render the rotation of the work unnecessary, and means for compressing the heated sections of the said objects.

8. A glass-working machine comprising an endless chain or belt, a plurality of non-rotative work-holding clamps carried thereby, means for intermittently imparting a step-by-step movement to the said chain or belt, means for automatically opening the said clamps to receive and discharge the work, means for locally heating the objects carried by the said clamps, said heating means being adapted to function so as not to require the rotation of the work, and means for compressing the heated sections of the said objects.

9. A glass-working machine comprising an endless chain or belt, a plurality of work-holding clamps carried thereby, means for intermittently imparting a step-by-step movement to the said chain or belt, means for automatically opening the said clamps to receive and discharge the work, a plurality of heating devices adapted to project flames upon sections of the objects carried by the said clamps transversely to their path of movement, said heating devices being present in sufficient number so as to render the rotation of the work unnecessary, and means for compressing the heated sections of the said objects.

10. A glass-working machine comprising two parallel shafts, each shaft carrying a pair of spaced sprocket wheels, two endless chains engaging the said sprocket wheels, a plurality of work-holding clamps attached at substantially equal intervals to the said chains, and means for intermittently imparting a step-by-step rotation to one of the said shafts.

11. A work-holding clamp for glass-working machines and the like comprising a cruciform base member, means for attaching two arms of the said member to supports, a stationary jaw member secured to a third arm of the said base member and a movable jaw member secured to the fourth arm of the said base member.

12. A work-holding clamp for glass-working machines and the like comprising a cruciform base member, means for attaching two arms of the said member to supports, a stationary jaw member secured to a third arm of the said base member, a movable jaw member adjustably secured to the fourth arm of the said base member and a tubular work-supporting member suspended from the center of the said base member.

13. A work-holding clamp for glass-working machines and the like comprising a cruciform base member, a stationary jaw member and a movable jaw member attached respectively to opposite arms of the said base member, a tubular work-holding member suspended centrally from the said base member, an inclined tube supported between the said tubular work-holding member and the arm of the base member which supports the said movable jaw, and a spring-pressed pin disposed within the said inclined tube and adapted to press the said movable jaw member toward the said stationary jaw member.

14. In a glass working machine, the combination with a pair of spaced endless belts or chains, of a plurality of work-holding clamps attached thereto and a plurality of cam tracks disposed adjacent to said belts or chains, each of said clamps comprising a cruciform base member, means of attaching two arms of said member to supports, a stationary jaw member secured to a third arm of said base member, a movable jaw member secured to the fourth arm of said base member, and a U-shaped lever rigidly secured to said movable jaw member and adapted to coöperate with the said pairs of cam tracks to separate the said jaw members in predetermined positions.

15. A glass-working machine comprising means for laterally and non-rotatively advancing in a rectilinear path a cylindrical or tubular glass object, means for locally heating said object, and means for compressing the heated portion of such object, the said compressing means comprising two adjacent bell-crank levers, a pressure plate carried by one arm of each of the said bell-crank levers, and a cam-operated toggle mechanism for moving the said bell-crank levers to cause the said pressure plates to approach each other.

16. A glass-working machine comprising a driving shaft, means driven by the said shaft for intermittently laterally, and non-rotatively advancing in a rectilinear path a set of work-holders, a cam secured to the said shaft and a pressure device operated by the said cam.

17. A glass-working machine comprising a driving shaft, means driven by said shaft for intermittently laterally, and non-rotatively advancing in a rectilinear path a set of work holders, a cam secured to the said shaft and a pressure device operated by the said cam, the said pressure device comprising two adjacently pivoted bell-crank levers, coöperating pressure members carried by the said bell-crank levers, a toggle mechanism for rotating the said levers, a longitudinally movable rod operatively connected to the said toggle mechanism, an arm secured to the said rod and a roller carried by the said arm and in operative engagement with the said cam.

18. A glass-working machine comprising means for intermittently laterally, and non-rotatively advancing in a rectilinear path a series of work holders, sets of burners disposed adjacent to and on opposite sides of the path of movement of the said work holders and adapted to project flames upon the objects held in the work holders in successive positions thereof, the number and design of said burners being such that it is unnecessary to rotate the work, and means for adjustably supporting the said burners.

19. A glass-working machine comprising means for intermittently laterally, and nonrotatively advancing in a rectilinear path a series of work holders, two sets of burners disposed adjacent to and on opposite sides of the path of movement of the said work holders and adapted to project flames upon the objects held in the work holders in successive positions thereof, and means for adjustably supporting the said burners, the said supporting means comprising a stationary support, vertically adjustable members secured to the said support and carrying outwardly extending rods and clamps adjustably secured to the said rods and adapted for attachment to the said sets of burners.

In testimony whereof I have hereunto subscribed my name this May 27th, 1916.

CHARLES EISLER.